US011522363B2

(12) United States Patent
La Rosa et al.

(10) Patent No.: US 11,522,363 B2
(45) Date of Patent: Dec. 6, 2022

(54) SUPPLY PROTECTION CIRCUIT THAT PROTECTS POWER TRANSISTOR FROM A SUPPLY SIGNAL OF AN INCORRECT POLARITY

(71) Applicant: STMicroelectronics S.r.l., Agrate Brianza (IT)

(72) Inventors: Manuela La Rosa, Gravina di Catania (IT); Giovanni Sicurella, Catania (IT); Giuseppe Meola, Capaci (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 267 days.

(21) Appl. No.: 16/555,220

(22) Filed: Aug. 29, 2019

(65) Prior Publication Data

US 2020/0076190 A1 Mar. 5, 2020

(30) Foreign Application Priority Data

Sep. 3, 2018 (IT) .......................... 102018000008313

(51) Int. Cl.
*H02H 11/00* (2006.01)
*G05F 3/20* (2006.01)
(52) U.S. Cl.
CPC ........... *H02H 11/003* (2013.01); *G05F 3/205* (2013.01)
(58) Field of Classification Search
CPC ...... H02H 11/003; H02H 11/002; H02H 3/18; G01R 31/55

(Continued)

(56) References Cited

U.S. PATENT DOCUMENTS 5,517,379 A * 5/1996 Williams ............. H02H 11/003
361/84
5,539,610 A * 7/1996 Williams ............. H02H 11/003
361/246

(Continued)

FOREIGN PATENT DOCUMENTS

EP 1401077 A1 9/2003
EP 1860774 A1 5/2007

OTHER PUBLICATIONS

IT Search Report and Written Opinion for IT Appl. No. 102018000008313 dated May 22, 2019 (8 pages).

(Continued)

*Primary Examiner* — Kevin J Comber
*Assistant Examiner* — Nusrat Quddus
(74) *Attorney, Agent, or Firm* — Crowe & Dunlevy

(57) ABSTRACT

An input node is configured to receive a supply signal which may be of a first polarity or a second polarity opposite the first polarity. A high input current circuit couples the input node to an output node through at least one power transistor having a control electrode. A low input current circuit couples a supply current from the input node to control circuit configured to control the power transistor. A circuit is provided to detect polarity reversal with respect to the supply signal. A protection circuit for the low input current circuit operates to decouple the control circuit from the input node if the supply signal has the second polarity. A protection circuit for the high input current circuit operates to short-circuit the control electrode of the power transistor to the current path provided by the power transistor between the input node and the output node.

27 Claims, 10 Drawing Sheets

(58) Field of Classification Search
USPC ...... 323/265, 271–289; 307/10.1, 10.7, 10.8, 307/127, 130, 134, 138; 361/18, 20, 56, 361/58, 77, 79, 82, 84, 86, 87, 88, 90, 361/91.1–91.6, 93.1, 101, 111, 113, 115, 361/245–246
See application file for complete search history.

(56) References Cited

U.S. PATENT DOCUMENTS

| | | | | |
|---|---|---|---|---|
| 5,642,251 | A * | 6/1997 | Lebbolo | H02H 3/087 361/115 |
| 5,726,505 | A * | 3/1998 | Yamada | H02J 7/00308 307/127 |
| 5,764,465 | A * | 6/1998 | Mattes | B60R 21/01 361/77 |
| 5,781,390 | A * | 7/1998 | Notaro | H02H 11/003 361/84 |
| 6,043,965 | A * | 3/2000 | Hazelton | H02H 11/003 361/115 |
| 6,127,745 | A * | 10/2000 | Bolz | H02H 11/003 307/125 |
| 6,201,674 | B1 * | 3/2001 | Warita | G05F 1/5735 361/18 |
| 6,611,410 | B1 | 8/2003 | Makaran | |
| 6,628,489 | B1 * | 9/2003 | Pardoen | H02J 7/0034 361/84 |
| 7,504,750 | B2 * | 3/2009 | Bienvenu | H02H 11/003 307/138 |
| 7,554,777 | B2 * | 6/2009 | Fukami | H02J 7/00308 361/18 |
| 7,800,878 | B2 * | 9/2010 | Komatsu | H02M 1/32 361/84 |
| 7,962,787 | B2 * | 6/2011 | Camilleri | G06F 11/1441 714/24 |
| 9,531,259 | B2 * | 12/2016 | Tamura | H02M 3/07 |
| 9,559,681 | B2 * | 1/2017 | Saito | H03K 17/0822 |
| 10,439,607 | B2 * | 10/2019 | Wandres | H03K 17/74 |
| 11,050,238 | B2 * | 6/2021 | Boros | H02H 3/18 |
| 2009/0219659 | A1 | 9/2009 | Muhlenbein et al. | |
| 2011/0134576 | A1 * | 6/2011 | Clemente | H02H 11/002 361/77 |
| 2011/0267017 | A1 * | 11/2011 | Zhang | G05F 1/575 323/280 |
| 2013/0188287 | A1 * | 7/2013 | Imura | H02H 3/18 361/56 |
| 2013/0193754 | A1 * | 8/2013 | Sugiyama | B60L 58/10 307/10.7 |
| 2015/0109706 | A1 | 4/2015 | Iwamizu | |
| 2015/0280416 | A1 * | 10/2015 | Kreuter | H03K 17/0826 361/55 |
| 2015/0361942 | A1 * | 12/2015 | List | H02J 7/00 307/24 |
| 2016/0301235 | A1 * | 10/2016 | Okanoue | H02J 7/007184 |

OTHER PUBLICATIONS

Texas Instruments: "TPS2660x 60-V, 2-A Industrial eFuse With Integrated Reverse Input Polarity Protection," SLVSDG2D—Jul. 2016—Revised Apr. 2017 (53 pages).

* cited by examiner

SUPPLY PROTECTION CIRCUIT THAT PROTECTS POWER TRANSISTOR FROM A SUPPLY SIGNAL OF AN INCORRECT POLARITY

PRIORITY CLAIM

This application claims the priority benefit of Italian Application for Patent No. 102018000008313, filed on Sep. 3, 2018, the content of which is hereby incorporated by reference in its entirety to the maximum extent allowable by law.

TECHNICAL FIELD

The description relates to power supply protection techniques.

One or more embodiments may apply, for instance, to protecting devices against (for instance, accidental) power supply reversal of polarity.

BACKGROUND

Protection of electronic circuits from reverse polarity supply voltage is a desirable feature for users of devices such as, for instance, e-fuses, low-dropout regulators (LDO's) and so on.

Electronic systems may be protected from reverse polarity input supply, as caused by mis-wiring, for instance, by adding a power component such as a diode in series with the supply line. This additional discrete component may undesirably add to the cost of the system.

Other solutions, such as the industrial e-fuse with integrated reverse input polarity protection available as TPS2660x from Texas Instruments are capable of withstanding positive and negative supply voltages up to ±60 V and protecting an associated load correspondingly. The related architecture is based on a dedicated pin (RTN) operating as a reference for internal control circuits in the device. Protection is provided by applying a reverse polarity to the RTN pin with reference to a GND terminal. Making RTN negative like the input polarity facilitates managing reverse supply without damaging the control circuit.

This solution involves a fairly complex supply management and the availability of a negative reference on the board.

SUMMARY

An object of one or more embodiments is to contribute in overcoming the drawbacks outlined in the foregoing.

According to one or more embodiments, such an object is achieved by means of circuit having the features set forth in the claims that follow.

One or more embodiments may relate to a corresponding device. An e-fuse or a low-dropout regulator may be exemplary of such a device.

The claims are an integral part of the disclosure of embodiments as provided herein.

One or more embodiments may provide a (fully) integrated solution for reverse input supply protection without resorting to an external component such as an additional diode.

One or more embodiments can effectively withstand reverse voltage without damage.

One or more embodiments may facilitate providing effective protection of power components such as a power MOS transistor with a low value for RDSon (drain-to-source resistance with the transistor conductive).

One or more embodiments may facilitate reducing requirements in terms of semiconductor and board area in comparison with conventional solutions.

One or more embodiments may involve an improved architecture able to protect low-RDSon power MOS transistors from supply reversal.

In an embodiment, a circuit comprises: an input node configured to receive a supply signal of a first polarity or a second polarity opposite the first polarity; a first, high input current circuit between the input node and an output node of the circuit, the high input current circuit comprising at least one power transistor coupled to the input node and the output node, the at least one power transistor having a current conduction path therethrough and a control electrode; a second, low input current circuit section configured to receive a supply current from the input node, the low input current section configured to control the control electrode of the at least one power transistor in the high input current circuit section to control current flow from the input node to the output node via the current path through the at least one power transistor in the high input current circuit section; and a polarity reversal protection circuit. The polarity reversal protection circuit comprises: a) a low input current circuit section protection circuit module configured to decouple the low input current circuit section from the input node as a result of the input node receiving a supply signal of said second polarity; and b) at least one high input current circuit section protection circuit module configured to short-circuit the current path and the control electrode in said at least one power transistor coupled to the input node and the output node as a result of the input node receiving a supply signal of said second polarity.

The low input current circuit section protection circuit module may comprise: an electronic switch between the input node and the low input current circuit section, the low input current circuit section receiving a supply current from the input node as a result of the electronic switch being switched on; and a diode coupled to the electronic switch, wherein said diode is sensitive to the polarity of said supply signal at the input node, the diode configured to switch off the electronic switch as a result of the input node receiving a supply signal of said second polarity.

The electronic switch in the low input current circuit section protection circuit module may comprise a current path therethrough and a control electrode and wherein said diode: may be arranged between the control electrode and the current path through the electronic switch, and/or may be coupled to ground opposite the current path through the electronic switch via a current-limiting resistor.

The at least one power transistor in the high input current circuit section may be formed in a doped semiconductor well, said semiconductor well electrically coupled with the input node and having a connection to the current path through the at least one power transistor, said connection electrically conductive as a result of the input node receiving a supply signal of said second polarity, wherein the circuit comprises a respective current-limiting resistor in said connection.

The at least one high input current circuit section protection circuit module may comprise sensing circuitry coupled to the current path through the at least one power transistor in the high input current circuit section, the sensing circuitry sensitive to the polarity of said supply signal at the input node.

The or each power transistor in the high input current circuit section may have coupled therewith a control electrode protection switch coupled between the control electrode and the current path of the or each power transistor in the high input current circuit section, the control electrode protection switch coupled to said sensing circuitry and configured to short circuit the control electrode and the current path in the or each power transistor in the high input current circuit section as a result of the input node receiving a supply signal of said second polarity.

The sensing circuitry may comprise a resistive divider network coupled between the current path through the at least one power transistor and ground with an intermediate divider node coupled to the control electrode of the or each power transistor in the high input current circuit section.

The sensing circuitry may comprise a resistive divider network coupled between the current path through the at least one power transistor and ground with a intermediate divider node coupled to the control electrode of the or each power transistor in the high input current circuit section.

The resistive divider network may be coupled to ground via a divider network activation diode configured to become conductive and activate the resistive divider network as a result of the input node receiving a supply signal of said second polarity.

An embodiments further comprises driver circuitry between said low input current section and the control electrode of the at least one power transistor in the high input current circuit section, wherein said driver circuitry comprises: a respective electronic switch between the low input current section and the control electrode of the at least one power transistor in the high input current circuit section, the low input current section and the control electrode of the at least one power transistor in the high input current circuit section being mutually coupled as a result of said respective electronic switch being switched on, and a coupling diode coupled to the low input current section and the control electrode of the at least one power transistor in the high input current circuit section, wherein said coupling diode is sensitive via the low input current section to the polarity of said supply signal at the input node, the coupling diode configured to switch on said respective electronic switch as a result of the input node receiving a supply signal of said first polarity.

The coupling diode and the control electrode of said respective electronic switch may be coupled to ground via a pull-down resistor.

The low input current section may comprise charge pump circuitry configured to generate, as a result of the input node receiving a supply signal of said first polarity: a bias voltage applied to the coupling diode opposite the control electrode of the at least one power transistor, the bias voltage higher than the voltage at said output node; and at least one reference voltage applied to the current path of said respective electronic switch the at least one reference voltage between said bias voltage and the voltage at said output node.

The high input current circuit section may comprise a pair of power transistors arranged with cascaded current paths therethrough in a back-to-back configuration.

An embodiment further comprises undershoot protection circuitry comprising, coupled between the output node and ground, a cascaded arrangement of: an undershoot diode configured to become conductive a result of the input node receiving a supply signal of said second polarity, and an undershoot current limiting resistor.

A feedback signal path from the output node to the low input current circuit section comprises a resistive divider network configured to be coupled between the output node and ground with an intermediate divider node configured to be coupled to the low input current circuit section, and feedback protection circuitry comprising: a) a feedback protection switch comprising one of: a1) an output electronic switch of the resistive divider network, said output electronic switch arranged between said intermediate divider node of the resistive divider network and the low input current circuit section, or a2) an input electronic switch of the resistive divider network, said input electronic switch arranged between the output node and the divider network; wherein the low input current circuit section is coupled to said intermediate divider node as a result of said feedback protection switch being switched on, b) a feedback protection diode coupled to said feedback protection switch wherein said feedback protection diode is sensitive to the polarity of said supply signal at the input node, the feedback protection diode configured to switch off said feedback protection switch and decouple the low input current circuit section from the resistive divider network as a result of the input node receiving a supply signal of said second polarity.

The feedback protection diode and a control electrode of said feedback protection switch may be coupled to ground via a joint resistor.

The input electronic switch of the resistive divider network may be arranged between the output node and the divider network and said feedback protection diode is coupled to said charge pump circuitry to receive said bias voltage therefrom.

An embodiment may further comprise an electrostatic discharge (ESD) protection network, comprising: a first electrostatic discharge rail and a second electrostatic discharge rail, first electrostatic discharge diodes conductive towards the first electrostatic discharge rail from said input node, said output node and ground, respectively, second electrostatic discharge diodes conductive from the second electrostatic discharge rail towards said input node, said output node and ground, respectively.

A voltage clamp may be configured to clamp together the first and the second electrostatic discharge rails as a function of the signal at said semiconductor well.

In an embodiment, a device comprise: a circuit according to the foregoing, a power supply source coupled to said input node and configured to apply to said input node a supply signal of a first polarity or a second polarity, the second polarity opposite the first polarity, and an electrical load coupled to said output node.

BRIEF DESCRIPTION OF THE DRAWINGS

One or more embodiments will now be described, by way of example only, by referring to the enclosed figures, wherein.

DETAILED DESCRIPTION

Throughout the figures, like parts or elements are indicated by like reference signs so that a detailed description of these parts or elements will not be unnecessarily repeated for brevity. Also, a certain part or element may be shown in different configurations and/or positions throughout the figures; these different representations are merely for the sake of simplicity and ease of explanation and do not necessarily imply a different structure or mode of operation of the part or element involved.

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Figure 1:
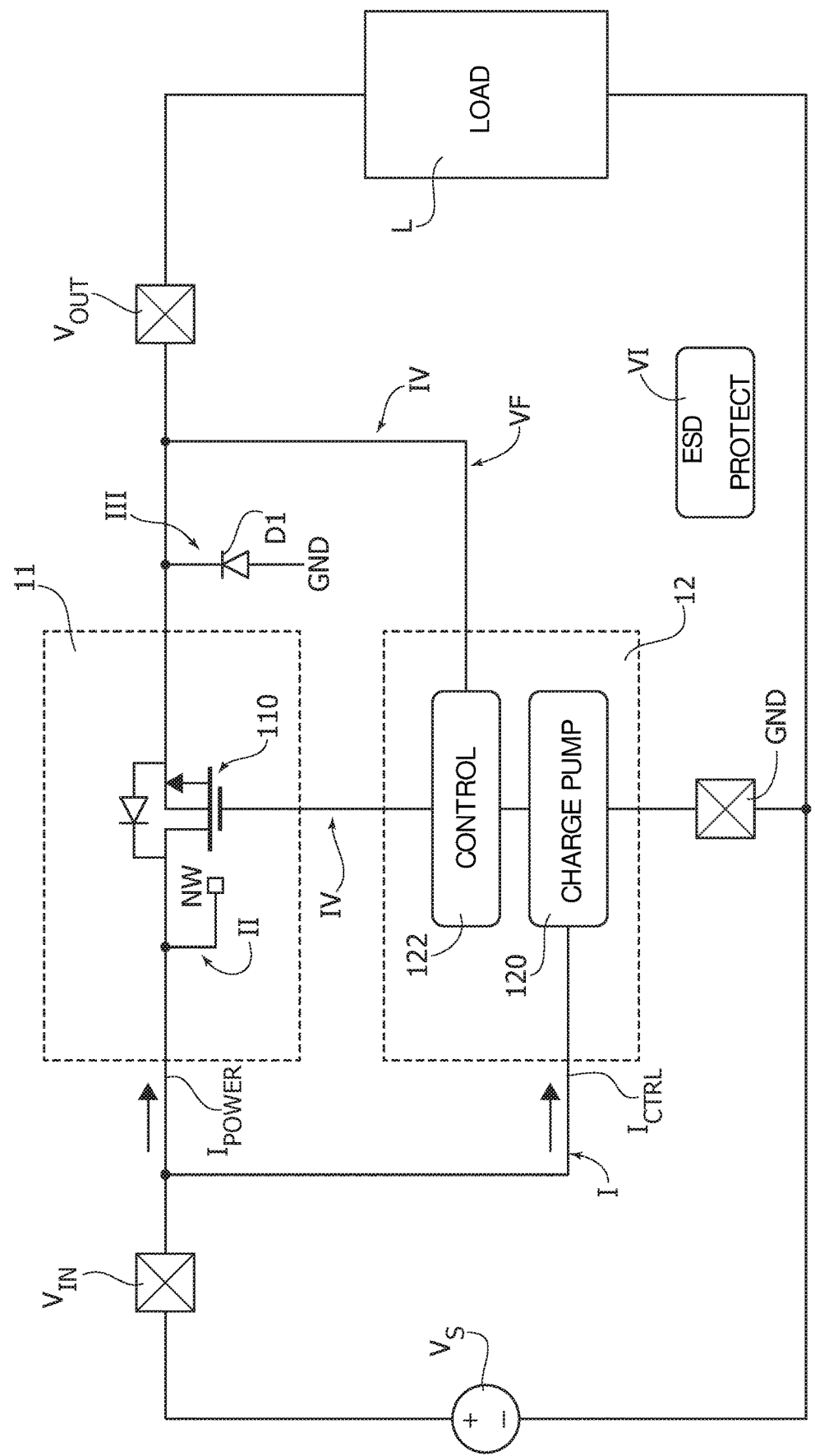
FIG. 1 is a block diagram of a device for which protection from supply reversal is desirable.

FIG. 1 shows an exemplary architecture of a device 10 for which protection from power supply polarity reversal (for instance, reverse battery) is desirable.

A device 10 as exemplified herein comprises an input node $V_{IN}$ configured to receive an input (voltage) from a supply source Vs (a battery, for instance) and an output node $V_{OUT}$ configured to drive a load L.

It will be appreciated that both the supply source Vs and the load L may be distinct elements from the embodiments.

As noted, one or more embodiments may be applied to many different devices (e-fuses and low-dropout regulators as cited previously are just possible examples).

The representation between a supply source Vs and a load L is thus intended to be representative of a wide variety of different topologies to which one or more embodiments may be applied. In that respect, it will be appreciated that one or more embodiments may be largely "transparent" to the type of device to which they can be applied.

A device 10 as exemplified herein can be regarded as comprising two main circuit sections: a high input current section 11 and a low input current section 12.

In one or more embodiments, a (large) power MOS transistor 110, capable of "tuning" a current $I_{POWER}$ flowing from the input (supply) node $V_{IN}$ towards the load L via the output node $V_{OUT}$ may represent the core of the high current section 11. The transistor 110 has a first conduction electrode (for example, drain) coupled to the input and a second current conduction electrode (for example, source) coupled to the output.

In practical applications, the power MOS transistor 110 may be of a large size in order to meet requirements both in terms of a low value for RDSon (drain-to-source resistance with the transistor conductive) and as regards the capability of admitting high values for the intensity of $I_{POWER}$ (some Amperes, for instance).

It is noted that a small portion (denoted $I_{CTRL}$ in FIG. 1) of the current supplied from $V_{IN}$ (about some hundreds of milliAmperes) may be used order to supply the charge pump 122 in the low input current section 12 of the device 10.

Various solutions can be devised in order to protect the two circuit sections 11 and 12.

For instance the low current section 12 can be protected by coupling in series therewith a switch configured to disconnect the low-current section 12 from the input node $V_{IN}$ as a result of a reverse polarity applied/detected.

It is noted such a solution is hardly applicable for the high-current section 11.

In that case, meeting with RD Son may involve a fourfold increase of the section area.

One or more embodiments may thus replace a "hard" or "brute force" approach (disconnecting the entire device from the input voltage $V_S$) with an integrated set of protection measures—implemented under the supervision of a control block 120—that protect (only) a reduced set of points of the device 10 which may become critical in the presence of a supply reversal event.

Figure 2:
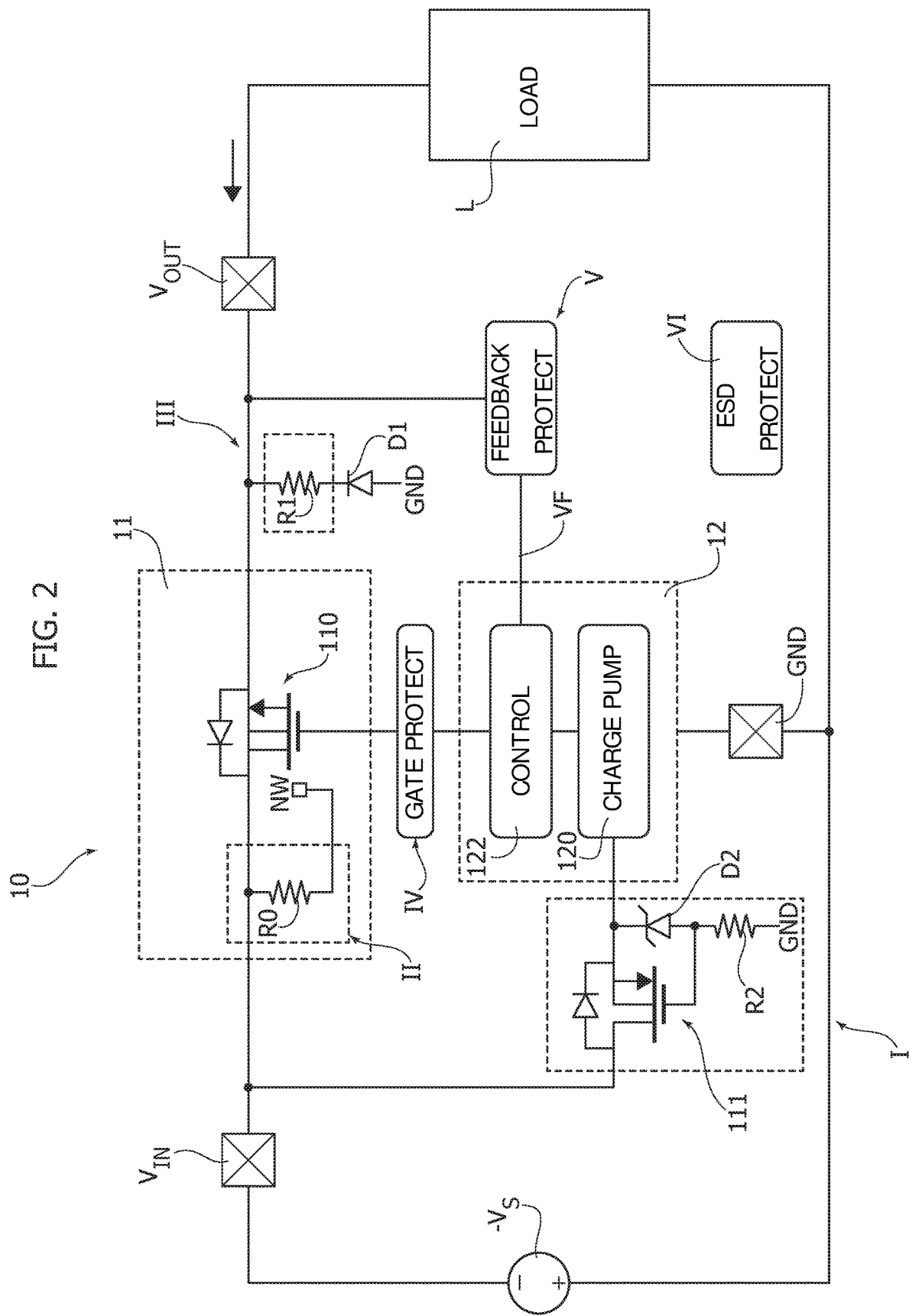
FIG. 2 is exemplary of possible approaches in providing protection from supply reversal in a device as exemplified in FIG. 1.

In one or more embodiments as exemplified herein, these critical points, designated I to VI in FIGS. 1 and 2, may include:

I) protection of the low-current section 12,
II) protection of the high-current section 11,
III) undershoot circuit protection,
IV) protection of the gate of the power MOSFET transistor 110,
V) voltage feedback protection,
VI) ESD network protection.

These protection measures will now be described in detail with reference to FIG. 3 onwards.

It will be otherwise understood that one or more embodiments may contemplate, for instance in view of less taxing operation scenarios expected and/or due to the circuit architecture (see, for instance, FIGS. 8 to 10 and the related description in the following), the provision of only a portion (subset) of the full set of the protection measures I to VI.

I) Protection of the Low-Current Section

One or embodiments may address issues related to the possible use of highly doped p-type substrates, which are conductive (this may be the case, for instance, of state-of-the-art BCD technologies) so that a substrate "plug" may connect it to the ground (GND).

In the presence of a supply voltage $V_S$ applied with reverse polarity, the substrate/n-well diode of all n-wells of the device connected to the input node $V_{IN}$ will be forward biased.

A dangerously high current may thus flow in the low impedance path from ground GND to VIN, through the substrate.

For that reason, one or more embodiments may include a protection network as indicated by I in FIG. 2.

In one or more embodiments, the network I may include an electronic switch (a PMOS transistor, for instance) 111 having a Zener diode D2 coupled between the current path and the control electrode (that is the source-drain current path and the gate, respectively, in the case of a field-effect transistor such as a MOSFET) of the transistor 111.

The network I is exemplary of the possibility of protecting the low current section 12 against supply reversal by coupling therewith a switch (here, the transistor 111) configured to disconnect the low-current section 12 from the input node $V_{IN}$ as a result of a reverse polarity applied/detected (that is VIN=>-$V_S$).

In one or more embodiments as exemplified herein, the Zener diode D2 has an associated resistor R2 coupled between the (anode of) the Zener diode D2 (which has its cathode coupled to the current path of the transistor 111) and ground GND so that the control electrode (gate) of the transistor 111 is brought to a voltage resulting from the voltage drop across R2.

One or more embodiments may thus take advantage of the fact that the low-current circuit section 12 may be supplied with a low voltage drop with respect to the voltage at the input node $V_{IN}$ so that the value of the input control current $I_{CTRL}$ is relatively low.

Protection against supply voltage reversal may thus be facilitated (even) with a "small" switch, that is with a transistor 111 having a (very) small area.

II) Protection of the High-Current Section

The same solution discussed previously for the low-current circuit section 12 is hardly applicable to the high-current circuit section 11 in view of the expectedly high values for $I_{POWER}$ and the low-drop behavior desired between $V_{IN}$ and $V_{OUT}$.

Also, in various applications switching off (that is interrupting) the connection between the (reverse) voltage supply at $V_{IN}$ and the power transistor 110 may be undesirable.

One or more embodiments may address an issue related to the fact that (according to an otherwise conventional implementation approach) the power transistor 110 may have an n-well connection NW.

Such n-well terminals may be connected to the highest voltage of the circuit which, with forward polarization (that is with a "correct" supply connection) corresponds to the voltage at $V_{IN}$.

Figure 3A:
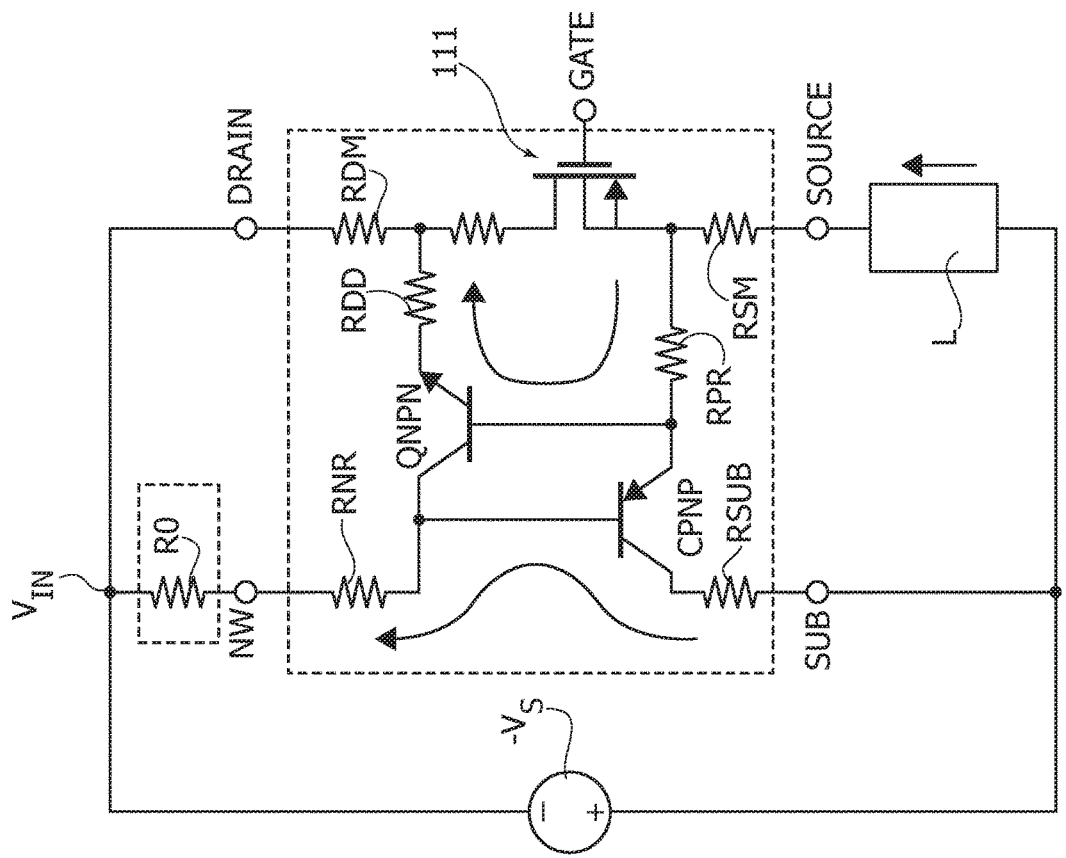
FIGS. 3A-3B is exemplary of a possible implementation of embodiments.

As exemplified in FIG. 3A, in the presence of a reversed input voltage ($-V_S$), a high current may flow from the substrate SUB to NW through the n-well/substrate parasitic $Q_{PNP}$ transistor, having a (very) low β.

This may represent a dangerous condition for the device.

Additionally, if the reverse current flowing from the load L were high enough to turn on the $Q_{NPN}$ parasitic transistor (having β>10) a portion of the current coming from the substrate might still flow across the drain terminal of the transistor 110.

One or more embodiments may facilitate avoiding such a condition by reducing the current flows coming from substrate.

Figure 3B:
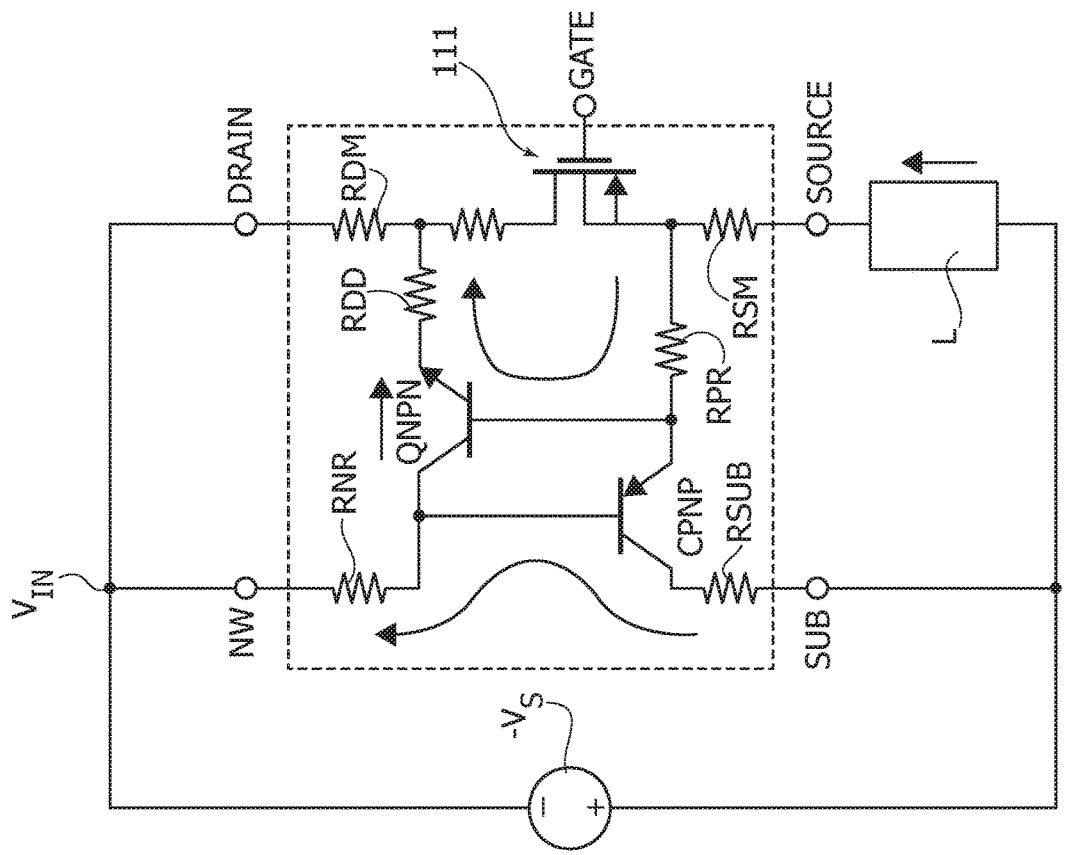

As exemplified in FIG. 3B, in one or more embodiments, current flows through the NW contact may be reduced by providing a resistor R0 coupled between the input node $V_{IN}$ and the NW contact.

As noted, if the reverse current flowing from the external load L were capable of turning-on the $Q_{NPN}$ parasitic transistor, substrate current may still flow towards the input node $V_{IN}$ through the drain contact of the transistor 110.

One may otherwise reasonably assume that, in various applications, the external load L may include adequate protection against input voltage polarity inversion. This will facilitate keeping the reverse current from the load must at a low value, thus facilitating preventing that the $Q_{NPN}$ parasitic transistor of the power transistor 110 may undesirably turn on.

III) Undershoot Circuit Protection

Devices 10 as exemplified in FIGS. 1 and 2 may include undershoot protection for the output node $V_{OUT}$.

This may be implemented with a diode D1 coupled between the output node $V_{OUT}$ (cathode) and ground GND (anode).

This may be the source of critical issues in the presence of a reverse polarity (that is a negative voltage, $-V_S$) applied to the input node $V_{IN}$.

In that case, also the output node $V_{OUT}$ will go negative, so a large current may flow from ground through the D1 diode.

Again, this current might also turn-on the $Q_{NPN}$ parasitic transistor of the power transistor 110 (see the previous discussion related to the protection of the high-current circuit section 11) adding to the current flow also the current coming from the substrate.

In one or more embodiments, current flow through the diode D1 is limited by arranging a resistor R1 in series with the diode D1

IV) Power Transistor Gate Protection

Protecting the control terminal (gate) of the power transistor 110 and its driver circuit block in the presence of input voltage inversion events is similarly desirable.

With $V_{OUT}$ going negative as a result of $V_{IN}$ going negative to $-V_S$, a large gate-source voltage may be applied to the transistor 110 which might damage the gate oxide thereof.

Figure 4:
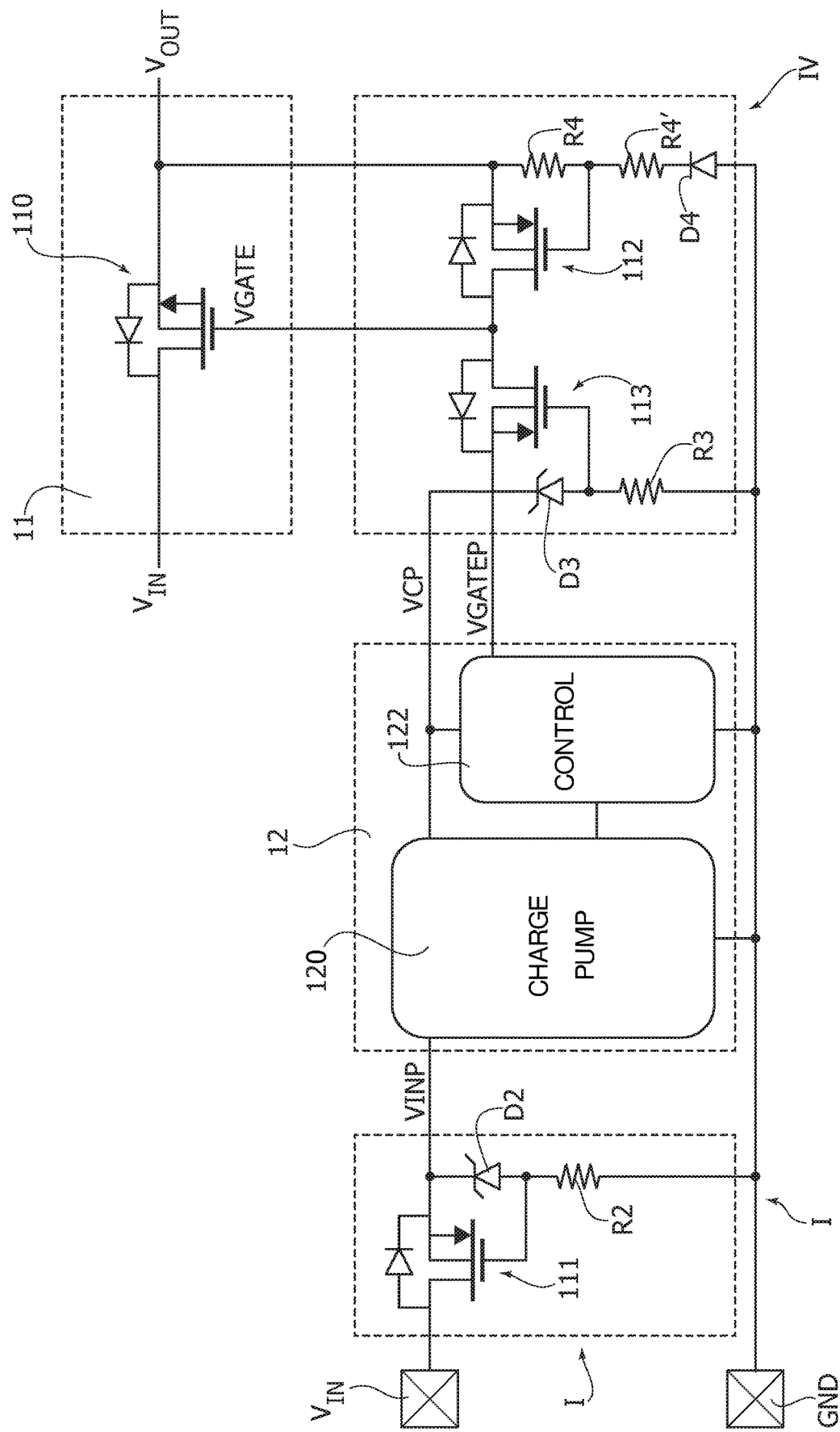
FIG. 4 is exemplary of a possible implementation of embodiments.

One or more embodiments may address that issue by resorting to the solution exemplified in FIG. 4, where also the protection network associated with the low-current section 12 is shown (indicated as I) for immediate reference, also representing the coupling to the input node $V_{IN}$ and ground GND.

One or more embodiments as exemplified in FIG. 4 may provide for the presence of an electronic switch 112 (a PMOS transistor, for instance) capable of short-circuiting the control electrode (gate, in the case of a field-effect transistor such as a MOS transistor) of the transistor 110 with the current path (source-drain, in the case of a field-effect transistor such as a MOS transistor) thereof, coupled, for instance at the source terminal to the output node $V_{OUT}$.

In that way, when $V_{OUT}$ goes negative (e.g. due to $V_{IN}$ going to $-V_S$) the power transistor 110 can be turned off to protect its gate oxide.

In one or more embodiments as exemplified in FIG. 4, the switch (transistor) 112 may be turned on, that is, made conductive, by a voltage drop at a resistive voltage divider R4-R4' coupled between $V_{OUT}$ and ground GND and made sensitive to the reverse current flow between ground GND and $V_{OUT}$ when $V_{OUT}$ goes negative. To that affect the voltage divider R4-R4' may be arranged in series with a diode D4 having its anode coupled to GND.

In that way, when $V_{OUT}$ is positive (no reversed supply), no current can flow through the resistor divider and the diode D4, so that the switch 112 is off (non conductive) and the power transistor 110 can operate as desired.

In one or more embodiments, if the control electrode (gate) of the power transistor 110 is shorted to $V_{OUT}$ by the switch 112, also the driver circuit of the gate of the power transistor 110, which may be physically located in the control block 120 of the low-current circuit section 12 can be protected.

In the case the device 10 uses an NMOS based power stage, a charge-pump may be provided in the block 120 to supply the gate driver circuit.

The charge pump can be configured—in a manner known to those of skill in the art—to generate a voltage VCP that, when the device supply is (correctly) forward connected, with $V_{IN}$ at +Vs, is always higher than the voltage at $V_{OUT}$ while the control circuit block 122 generates a voltage signal $V_{GATEP}$ is in the range between VCP and the voltage at $V_{OUT}$.

It will be otherwise appreciated that what is discussed here for $V_{GATEP}$ also applies to $V_{B2BP}$, which will discussed in the following in connection with FIG. 10.

A Zener diode D3 coupled to VCP is capable to turn-on, that is make conductive, an electronic switch 113 (a PMOS transistor, for instance) that couples the driver circuit in the low-current circuit section 12 to the gate of the power transistor 110 thus enabling operation thereof.

In one or more embodiments as exemplified herein, the Zener diode D3 has an associated pulldown resistor R3 coupled between the (anode of) the Zener diode D3 (which has its cathode coupled to the current path through the switch/transistor 113) and ground GND so that the control electrode (gate) of the transistor 113 is brought to a voltage resulting from the voltage drop across R3.

Consequently, as a result of a supply reversal event ($V_{IN}\Longrightarrow -V_S$), the pulldown resistor $R_3$ may keep the switch/transistor 113 off, that is, non conductive, thus isolating the control electrode (gate) of the power transistor 110 from the driver circuit, e.g. in the low current circuit section 12.

V) Voltage Feedback Protection

In a circuit layout as exemplified in FIG. 1, an output voltage feedback can be generated through a resistor divider coupled between the output node $V_{OUT}$ and ground.

This is exemplified in greater detail in the portion of FIG. 5A, where such a resistor divider is shown comprising two resistors $R_{FB0}$ and $R_{FB1}$.

When the output node $V_{OUT}$ becomes negative (e.g. due to $V_{IN}\Longrightarrow -V_S$), a reverse current will flow from GND to VOUT. The resistor divider comprising $R_{FB0}$ and $R_{FB1}$ can limit that current, but the feedback voltage VFB returned to the control circuit block 120 also becomes negative.

It is noted that, if the voltage drop is not too high, this is a tolerable condition for the system (device 10)

In certain circumstances this may not be the case and avoiding such a condition may be desirable.

The circuits shown in FIGS. 5B and 5C are exemplary of solutions which may be resorted to for that purpose.

In the solution exemplified in FIG. 5B, an electronic switch 115 (a PMOS transistor, for instance) is provided having the current path therethrough coupled between the partition point (tap point) of resistor divider comprising $R_{FB0}$ and $R_{FB1}$ and the to the control circuit block 120 at a node labeled VFBP.

In one or more embodiments a Zener diode D5 may be provided coupled to a reference voltage VDD. The voltage VDD is a supply voltage generated within the control block, for instance thanks to a regulator active on $V_{IN}$: in the presence of a reverse supply event that regulator may be turned off and VDD goes to ground GND.

The Zener diode D5 is capable of turning on, that is, making conductive, an electronic switch 115 that couples the partition point (tap point) of resistor divider comprising $R_{FB0}$ and $R_{FB1}$ and the to the control circuit block 120 thus enabling feedback operation with $V_{OUT}$ positive ($V_{IN}\Longrightarrow +V_S$).

In one or more embodiments as exemplified herein, the Zener diode D5 has an associated resistor R5 coupled between the (anode of) the Zener diode D5 (which has its cathode coupled to $V_{DD}$) and ground GND so that the control electrode (gate) of the transistor 115 is brought to a voltage resulting from the voltage drop across R5.

When the output node $V_{OUT}$ becomes negative (e.g. due to $V_{IN}\Longrightarrow -V_S$), the switch/transistor 115 will decouple the (voltage) feedback signal VFB from the control circuit 122.

Such an arrangement may exhibit a limitation (acceptable in various contexts of operation) in that the switch 115 turns on (that is, becomes conductive) only if $V_{FB}$ is greater than a certain voltage threshold, which may cause an inability to cover a low operative range of the signal at the output node $V_{OUT}$.

The solution exemplified in FIG. 5C addresses that issue by providing an electronic switch 116 (a PMOS transistor, for instance) having its current path therethrough coupled between $V_{OUT}$ and a node $V_{OUTP}$ with the resistor divider comprising $R_{FB0}$ and $R_{FB1}$ coupled between $V_{OUTP}$ and ground GND so that the feedback voltage VFB to the control block 122 is derived from $V_{OUTP}$.

A Zener diode D6 coupled to the charge pump voltage VCP (see FIG. 4) is capable of turning on, that is making conductive, the electronic switch 116 that couples $V_{OUTP}$ with $V_{OUT}$.

In one or more embodiments as exemplified herein, the Zener diode D5 has an associated resistor R6 coupled between the (anode of) the Zener diode D3 (which has its cathode coupled to $V_{DD}$) and ground GND so that the control electrode (gate) of the transistor 116 is brought to a voltage resulting from the voltage drop across R6.

In the solution exemplified in FIG. 5C, the switch/transistor 116 may thus de-couple the node $V_{OUT}$ from the resistor divider comprising $R_{FB0}$ and $R_{FB1}$, as a result the output node $V_{OUT}$ becoming negative (e.g. due to $V_{IN}\Longrightarrow -V_S$).

As discussed previously, the charge-pump voltage $V_{CP}$ can be devised to be always higher than the voltage at $V_{OUT}$ during the normal operation, so that $V_{OUT}$ can be transferred to the voltage divider as $V_{OUTP}$.

In this case, the voltage feedback feature will be able to cover the entire operative range of $V_{OUT}$, with a (minor) effect on accuracy due to the small voltage drop between $V_{OUT}$ and $V_{OUTP}$ across the switch/transistor 116.

VI—ESD Network Protection

Another point deserving consideration is the protection against reverse supply of an electrostatic discharge ESD network VI possibly provided in a device 10 as exemplified in FIG. 1.

Figure 6:
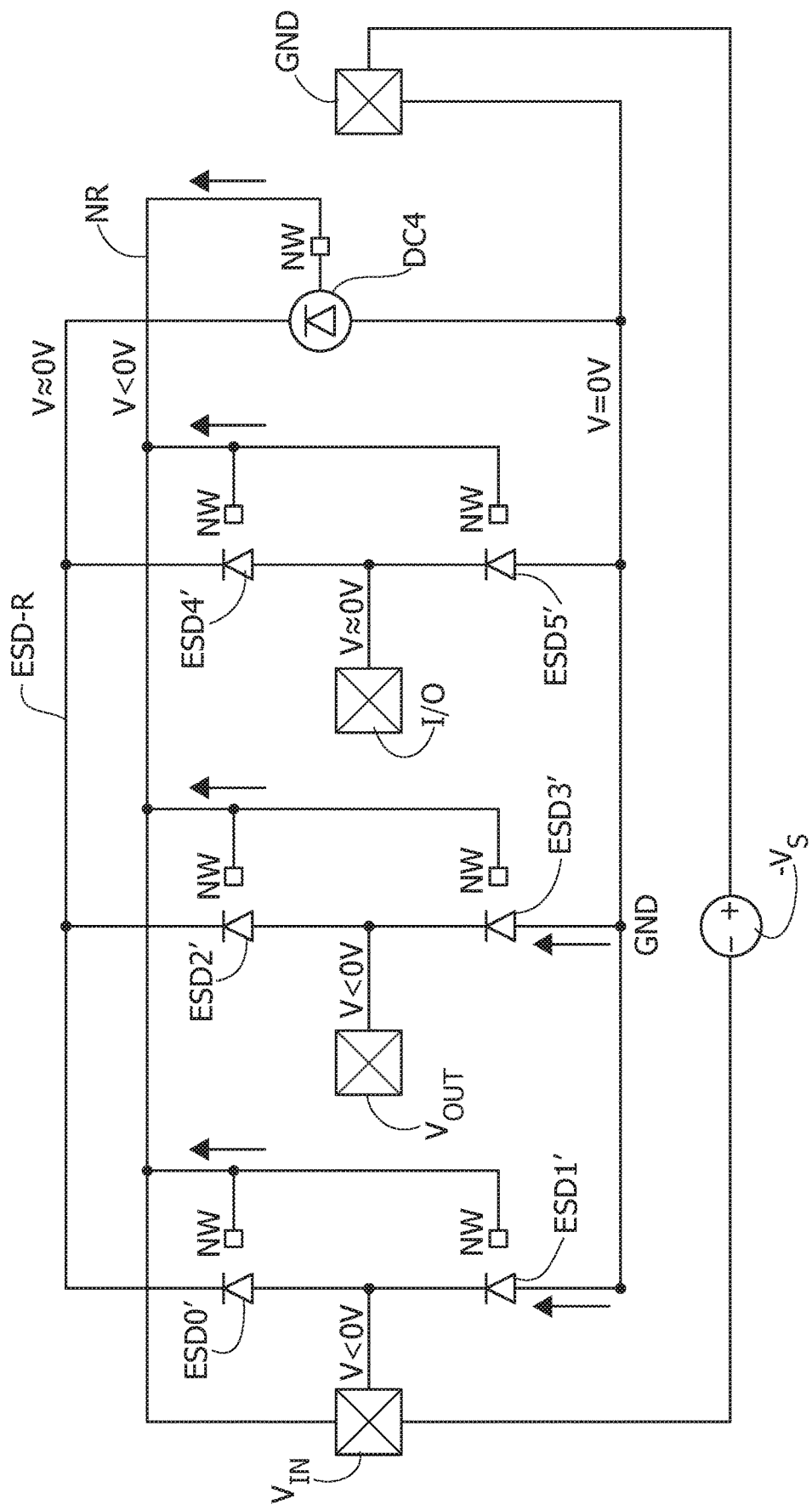
FIG. 6 is a circuit diagram exemplary of the possible provision of electrostatic discharge protection in an electronic device.

In a conventional arrangement as shown in FIG. 6 for immediate reference, such a network may comprise various ESD diodes ESD0', ESD1', ESD2', ESD3', ESD4', ESD5' coupled between a floating rail ESD-R and ground GND with an active (e.g. diode-based) clamp DC 4 sensitive to the n-well voltage NW (as discussed previously) and adapted to "clamp" the floating rail ESD-R to ground GND.

When a reverse voltage $-V_S$ is received at $V_{IN}$, both $V_{IN}$ and $V_{OUT}$ will go negative with respect to ground GND then a high current will (undesirably) flow through diodes such as ESD1' and ESD3' which are forward biased.

Moreover, protecting (all) the n-wells designated NW in FIG. 6 in the device 10 from the current flowing from the substrate is desirable.

Figure 7:
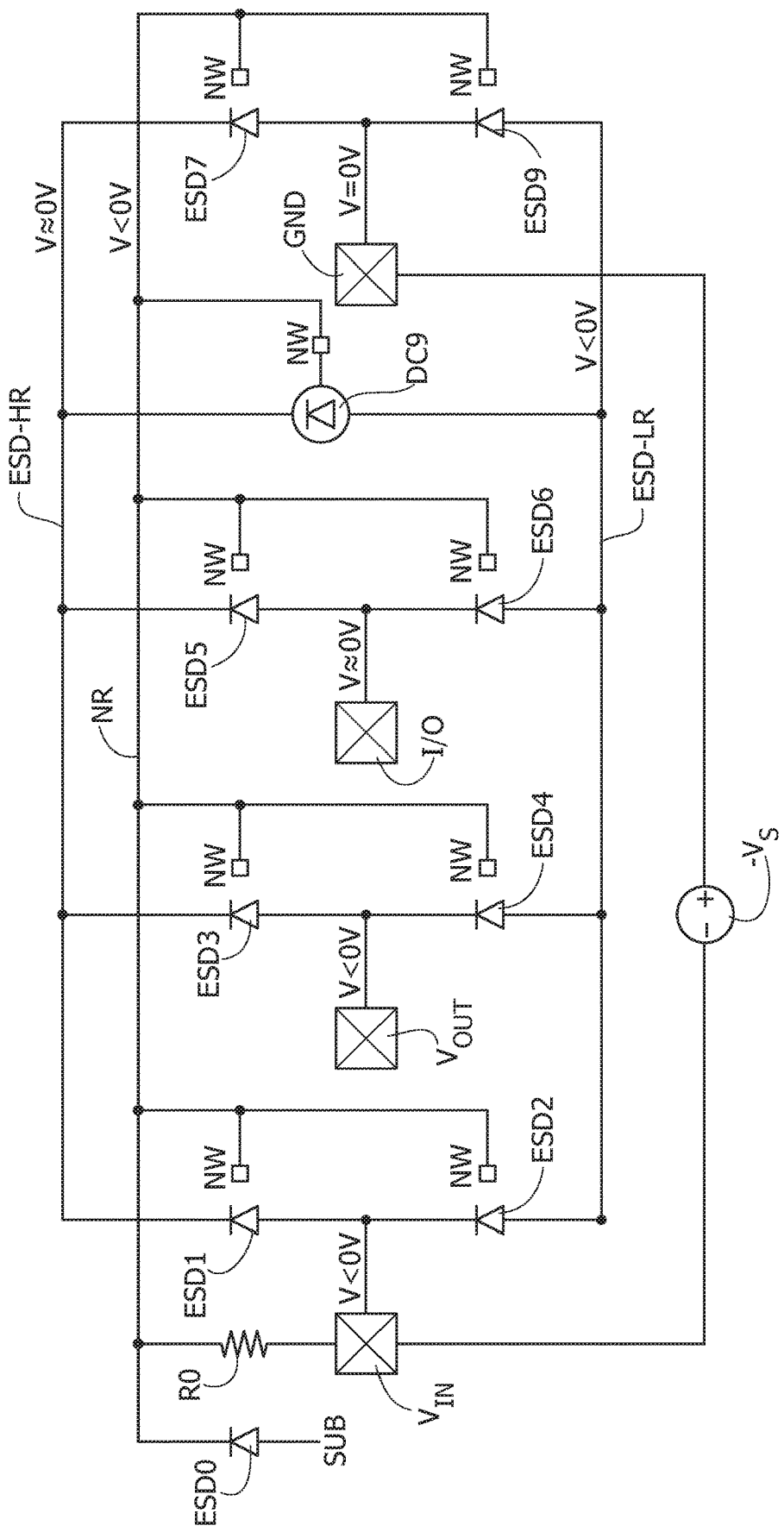
FIG. 7 is exemplary of a possible implementation of embodiments within the framework of an arrangement as shown in FIG. 6.

In order to protect such an ESD network from supply polarity inversion ($V_{IN}$==>$-V_S$) a sort of "common rail" ESD network can be adopted in one or more embodiments as exemplified in FIG. 7.

In an arrangement as exemplified in FIG. 7, rather than between a floating rail ESD-R and ground GND (as is the case in FIG. 6) the various ESD diode pairs ESD1, ESD2; ESD3, ESD4; ESD5, ESD6 plus an active clamp DC9, sensitive to the n-well voltage NW, as discussed previously for DC4, may be arranged between a "high" floating rail ESD-HR and a "low" floating rail ESD-LR with additional ESD diodes ESD7 and ESD8 between ground GND and the floating rails ESD-HR and ESD-LR, respectively (see FIG. 7, right hand side).

Also the n-wells NW in the device 10 may be coupled to a common "rail" NR in turn coupled to the substrate SUB via an (intrinsic) diode D0 with the resistor R0 already discussed in the foregoing in connection with the protection of the high-current circuit section 11 between the input node $V_{IN}$ and the N-wells NW.

This approach avoids that the "lower" ESD diodes (for instance ESD2, ESD4, ESD6) may be forward biased in the presence of a reverse supply voltage (VIN==>$-V_S$).

In fact, when $V_{IN}$ is forward polarized (+$V_S$) the "low" floating rail ESD-LR is connected to ground GND through the diode ESD9 so that the lower ESD diodes (ESD2, ESD4, ESD6) are reverse biased and thus non-conductive. Under these circumstances, the ESD network VI in FIG. 7 essentially operates like the standard solution of FIG. 6.

If a reverse input voltage is applied ($V_{IN}$==>$-V_s$) the "high" floating rail ESD-HR goes to ground and the "low" floating rail ESD-LR goes negative. The diode ESD9 will be reverse biased and no current will flow from ground GND to the $V_{IN}$ and $V_{OUT}$ pads.

The representation of the resistor R0 in FIG. 7 highlights the fact that the same solution adopted for protecting the high-current circuit section 11 has been adopted with the diode D0 includes all the base-collector junctions of $Q_{NPN}$ parasitic transistors in the ESD diodes and the voltage clamp DC9.

Figure 8:
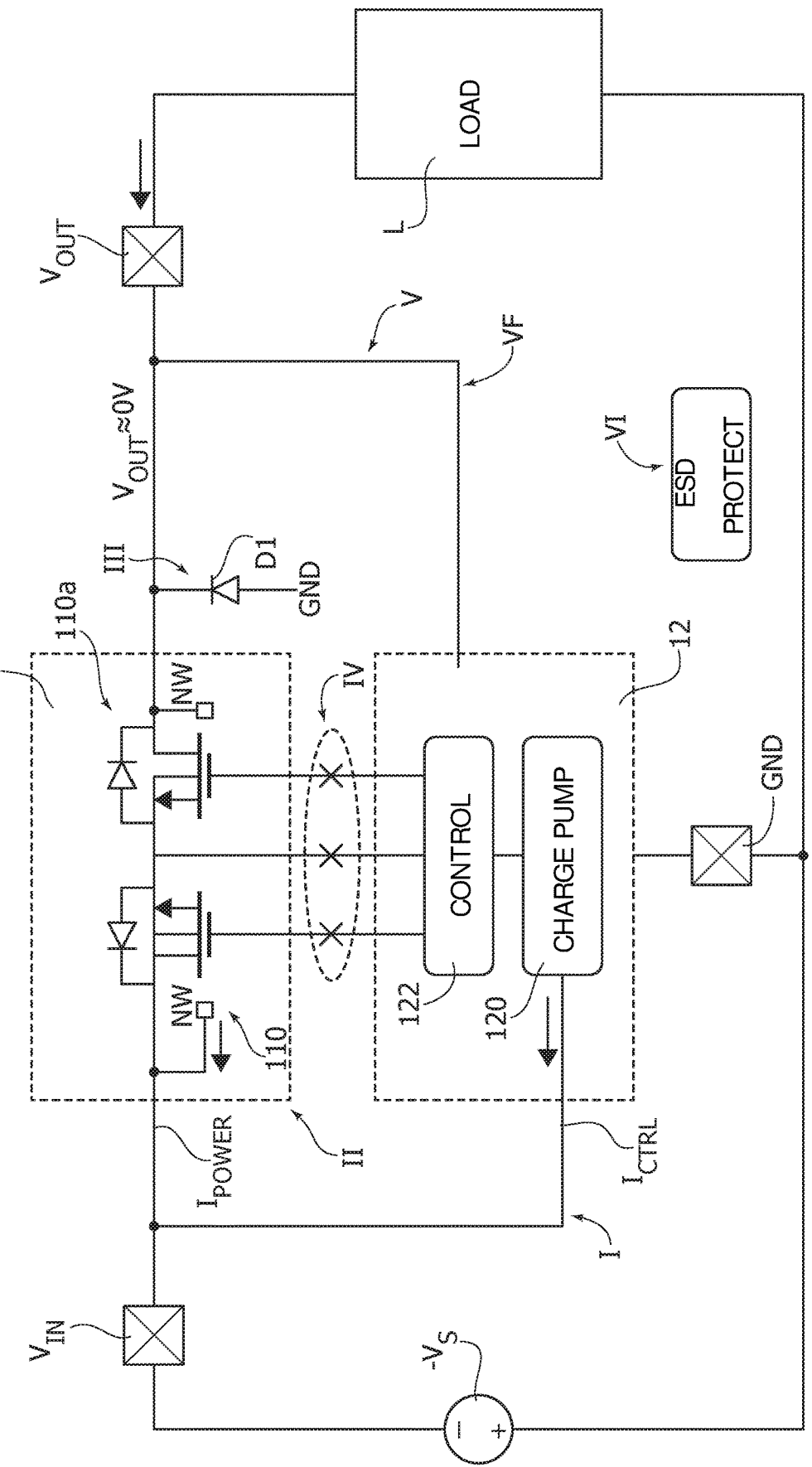
FIG. 8 is exemplary of a device involving a back-to-back arrangement of power components.
Figure 9:
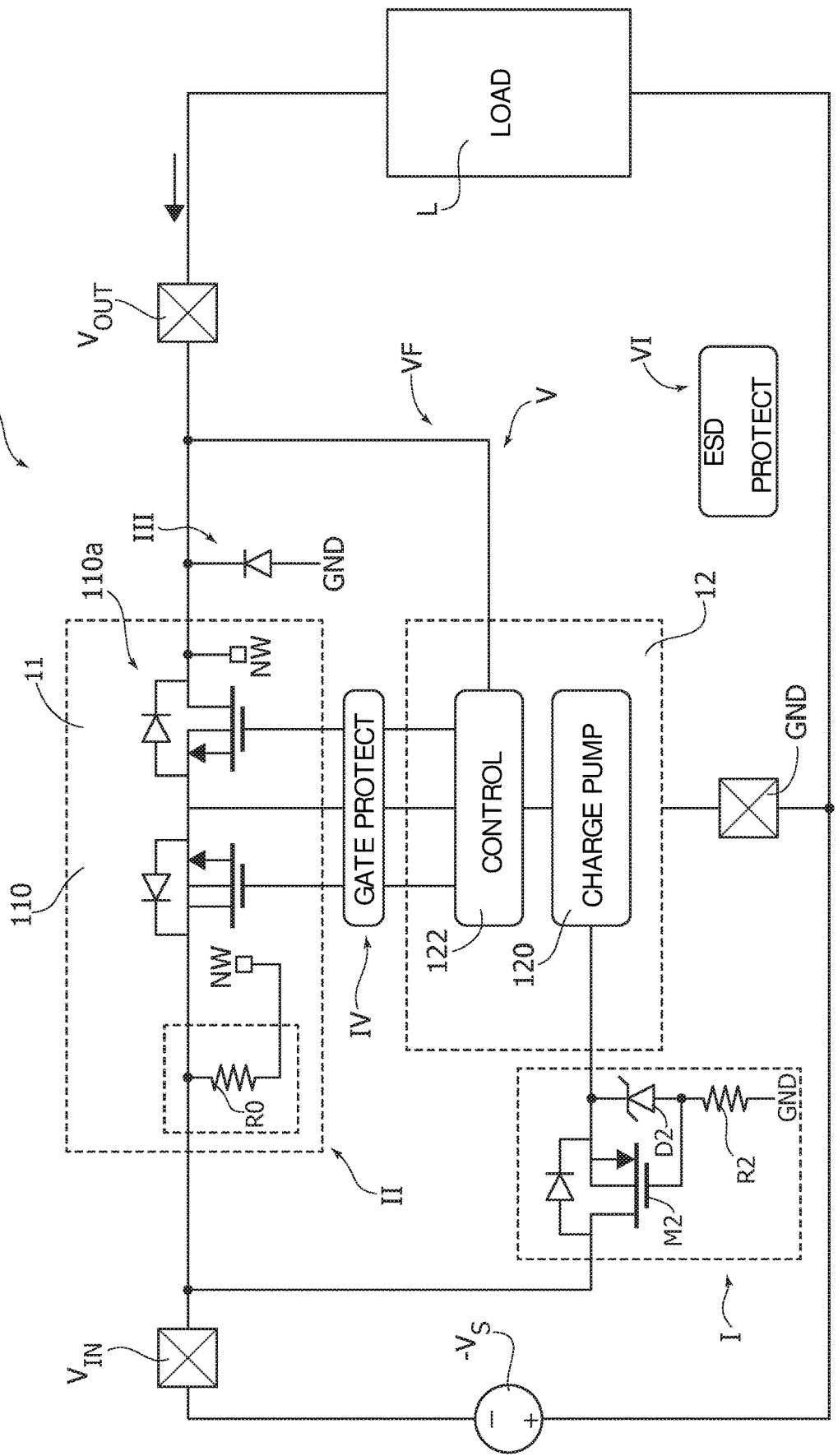
FIG. 9 is exemplary of possible approaches in providing protection from supply reversal in a device as exemplified in FIG. 8.
Figure 10:
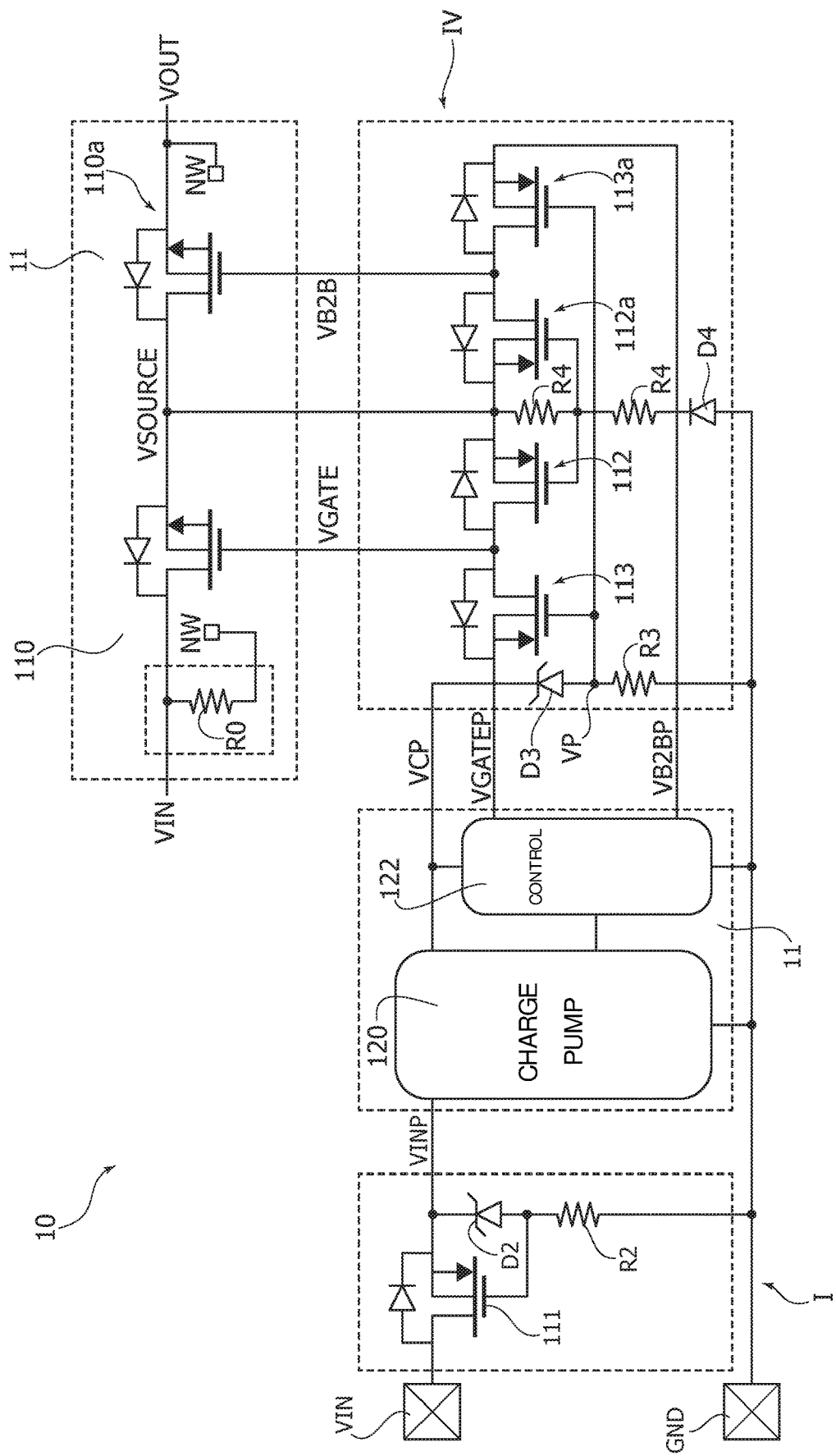
FIG. 10 is exemplary of a possible implementation of embodiments in a device as exemplified in FIGS. 8 and 9.

Turning now to FIGS. 8 to 10, FIG. 8 is intended to highlight, by way of comparison with FIG. 1, the possibility of applying one or more embodiments to devices 10 comprising power transistors (power MOS transistors, for instance) in a back-to-back configuration.

Specifically FIG. 8 shows by way of example a device 10 where the high current circuit section 11 comprises a further power transistor (a power MOS transistor for instance) 110a coupled to the power transistor 110 in back-to-back common source configuration.

Such a back-to-back architecture, with cascaded current paths (source-drain in the case of field-effect transistors such as MOSFET transistors) is widely used in power breaker devices, due to its ability to control the load current flow in both direction.

For instance, it can be used to counter the discharge of an external output capacitance when the input node $V_{IN}$ goes to a level below the level of the output node $V_{OUT}$.

In various applications the absolute maximum rating (AMR) and maximum operative voltage (MOV) specifications on the output node $V_{OUT}$ are lower in comparison to those for the input node $V_{IN}$.

A back-to-back architecture with NMOS transistors in a common source topology may facilitate circuit designers in choosing for the "output" NMOS transistor 110a a component of lower voltage class (and lower size) in comparison with the "input" NMOS transistor 110.

Designers may also be facilitated in selecting the sizes of the two NMOS components 110, 110a by taking into account both area and RDSon specifications.

The various protection features I to VI discussed in the foregoing may be applied (individually or in combination) also to the back-to-back architecture of FIG. 8 essentially as discussed in the foregoing. A corresponding description will not be repeated here for brevity.

FIGS. 9 and 10 are exemplary of the possibility, in one or more embodiments of the possibility of taking advantage of the back-to-back architecture of FIG. 8 to provide protection against reverse input voltages ($V_{IN}$==>$-V_S$). For instance, the back-to-back architecture of FIG. 8 may facilitate simplifying or possibly dispensing with certain ones of the protection features I to VI discusses in the foregoing.

For the sake of simplicity and ease of understanding, these further protection features will be described in connection with FIGS. 9 and 10 by referring to the other features I to VI already discussed insofar as these latter features may facilitate understanding the description related to FIGS. 9 and 10: as noted (and unless otherwise discussed in the following), the various protection features I to VI as discussed in the foregoing may be applied also to the back-to-back architecture of FIG. 8 essentially as discussed in connection with FIGS. 9 and 10.

Referring first to FIG. 9, in one or more embodiments, the power transistor gate protection circuit collectively designated IV may be configured in such a way that, as a result of input voltage being reversed ($V_{IN}$==>$-V_S$), the circuit IV is able to turn-off (that is, make non-conductive) the transistor 110a, so that no reverse current flows from the load L, thus facilitating a drop to ground GND of the voltage on the output node $V_{OUT}$.

In that way, certain ones of the critical points discussed previously in connection with arrangements including a single power transistor 110 may be overcome.

For instance, a back-to-back architecture as exemplified in FIG. 8 may facilitate dispensing with: a reverse voltage protection for the external load L, and/or undershoot circuit protection (III in the foregoing), and/or voltage feedback protection (V in the foregoing).

It is noted that, in a back-to-back architecture as exemplified in FIG. 8, no reverse current can flow through the power transistor 110 in the presence of input voltage reversal, the $Q_{NPN}$ parasitic transistor of the transistor 110 can be reasonably expected to be off, that is, non-conductive.

One or more embodiments comprising a back-to-back architecture as exemplified in FIG. 8 may thus include protection of the low-current section 12 (I in the foregoing), protection of the n-well contact of the high-current section 11 (as discussed as part of II in the foregoing) as well as ESD network protection (VI in the foregoing).

One or more embodiments comprising a back-to-back architecture as exemplified in FIG. 8 may include a power transistor gate protection feature (IV in the foregoing) further developed as shown in FIG. 10.

The arrangement exemplified in FIG. 10 essentially reproduces the circuit layout (and circuit operation) as discussed previously in connection with FIG. 4, with a pair of further transistors 112a and 113a which "mirror" with respect to the transistor 110a the coupling and operation of the transistors 112 and 113 in connection with the transistor 110.

As exemplified in FIG. 10 coupling and operation of: the divider network comprising the resistors R4, R4' and the diode D4, coupled between the common source of 110 and 100a and the partition node between R4, R4' coupled to the control electrodes of the transistors 112 and 112a, and the Zener diode D3 and the resistor R3, with the node therebetween, designated VP, coupled to the control electrodes of the transistors 113 and 113a, may be essentially as discussed previously in connection with FIG. 4 with a voltage $V_{B2BF}$ from the controller block 122 playing in respect of the transistor 113a a role similar to the role played by the voltage $V_{GATEP}$ from the controller block 122 in respect of the transistor 113a (coupling to the current path).

The protection circuit exemplified of FIG. 10 is able to turn-off (that is make non-conductive) both transistors 110 and 110a and isolate their control electrodes (gates, in the case of field-effect transistors) from the control block 122 as a result of input voltage being reversed ($V_{IN}=>-V_S$).

One or more embodiments are suited to be implemented using Bipolar-CMOS-DMOS (BDC) technologies.

Results obtained indicate that in the case of a negative supply applied on an input terminal and the gates of the power transistors are maintained in a safe condition (a few mV under GND, for instance). Also the well pocket (NR) voltage was found to be maintained in a controlled condition by limiting current flow. The VGS voltages of NMOS transistors were also found to remain at an adequate distance from the ON threshold by keeping MOS transistors in an OFF state as desired.

In one or more embodiments, a circuit (for instance, 10) may comprise:

an input node (for instance, $V_{IN}$) configured to receive a supply signal of a first polarity (for instance, $V_S$) or a second polarity (for instance, $-V_S$), the second polarity opposite the first polarity;

a first, high input current circuit section (for instance, 11) between the input node and an output node of the circuit, the high input current circuit section comprising at least one power transistor (for instance, 110, 110a) coupled to the input node and the output node, the at least one power transistor having a current conduction path (see, for instance, the current $I_{POWER}$) therethrough and a control electrode, a second, low input current circuit section (for instance, 12) configured to receive a supply current (for instance, $I_{CTRL}$) from the input node, the low input current section configured to control (for instance, via 120, 122; 113; 113a) the control electrode of the at least one power transistor in the high input current circuit section to control current flow (see, for instance, the current $I_{POWER}$) from the input node to the output node via the current path through the at least one power transistor in the high input current circuit section, and polarity reversal protection circuitry (for instance, I to VI).

The polarity reversal protection circuitry comprises:

a) a low input current circuit section protection circuit module (for instance, I) configured (see, for instance, 111, D2, R2) to decouple the low input current circuit section from the input node as a result of the input node receiving a supply signal of said second polarity; and b) at least one high input current circuit section protection circuit module (for instance, IV) configured (for instance, 112, R4, R4', D4) to short-circuit the current path and the control electrode in said at least one power transistor coupled to the input node and the output node as a result of the input node receiving a supply signal of said second polarity.

In one or more embodiments, the low input current circuit section protection circuit module may comprise:

an electronic switch (for instance, 111) between the input node and the low input current circuit section, the low input current circuit section receiving a supply current from the input node as a result of the electronic switch being switched on, and a diode (for instance, D2) coupled to the electronic switch, wherein said diode is sensitive (for instance, via R2) to the polarity of said supply signal at the input node, the diode configured to switch off the electronic switch as a result of the input node receiving a supply signal of said second polarity.

In one or more embodiments, said electronic switch in the low input current circuit section protection circuit module may comprise a current path therethrough and a control electrode and wherein said diode:

may be arranged between the control electrode and the current path through the electronic switch, and/or may be coupled to ground (for instance, GND) opposite the current path through the electronic switch via a current-limiting resistor (for instance, R2).

In one or more embodiments, the at least one power transistor in the high input current circuit section may be formed in a doped semiconductor well, said semiconductor well electrically coupled with the input node and having a connection (for instance, NW) to the current path through the at least one power transistor, said connection electrically conductive as a result of the input node receiving a supply signal of said second polarity, wherein the circuit comprises a respective current-limiting resistor (for instance, R0) in said connection.

In one or more embodiments:

said at least one high input current circuit section protection circuit module (for instance, II, IV) may comprise sensing circuitry (for instance, R4, R4', D4) coupled to the current path through the at least one power transistor in the high input current circuit section, the sensing circuitry sensitive (for instance, by sensing $V_{OUT}$—see FIG. 4—or $V_{SOURCE}$—see FIG. 10) to the polarity of said supply signal at the input node, the or each power transistor in the high input current circuit section may have coupled therewith a control electrode protection switch (for instance, 112, 112a) coupled between the control electrode and the current path of the or each power transistor in the high input current circuit section, the control electrode protection switch coupled to said sensing circuitry and configured to short circuit the control electrode and the current path in the or each power transistor in the high input current circuit section as a result of the input node receiving a supply signal of said second polarity.

In one or more embodiments:

said sensing circuitry may comprise a resistive divider network coupled between the current path (for instance, $V_{OUT}$; $V_{SOURCE}$) through the at least one power transistor and ground with an intermediate divider node coupled to the control electrode of the or each power transistor in the high input current circuit section.

In one or more embodiments, said sensing circuitry may comprise a resistive divider network (for instance, R4, R4') coupled between the current path (for instance, at $V_{OUT}$, $V_{SOURCE}$) through the at least one power transistor and ground with an intermediate divider node coupled to the control electrode of the or each power transistor in the high input current circuit section.

In one or more embodiments, said resistive divider network (for instance, R4, R4') may be coupled to ground via a divider network activation diode (for instance, D4) configured to become conductive and activate the resistive divider network as a result of the input node receiving a supply signal of said second polarity.

One or more embodiments may comprise driver circuitry (for instance, 113, 113a, D3, R3) between said low input current section and the control electrode of the at least one power transistor in the high input current circuit section, wherein said driver circuitry may comprise:

a respective electronic switch (for instance, 113; 113a) between the low input current section and the control electrode of the at least one power transistor in the high input current circuit section, the low input current section and the control electrode of the at least one power transistor in the high input current circuit section being mutually coupled as a result of said respective electronic switch being switched on, a coupling diode (for instance, D3) coupled (for instance, via VCP) to the low input current section and the control electrode of the at least one power transistor in the high input current circuit section, wherein said coupling diode (D3) is sensitive via the low input current section (for instance, via VINP, 120, 122) to the polarity of said supply signal at the input node, the coupling diode configured to switch on said respective electronic switch as a result of the input node receiving a supply signal of said first polarity.

In one or more embodiments, the coupling diode and the control electrode of said respective electronic switch may be coupled to ground via a pull-down resistor (for instance, R3).

In one or more embodiments, the low input current section may comprise charge pump circuitry (for instance, 120) configured to generate, as a result of the input node receiving a supply signal of said first polarity:

a bias voltage (for instance, VCP) applied to the coupling diode opposite the control electrode of the at least one power transistor, the bias voltage higher than the voltage at said output node; and at least one reference voltage (for instance, $V_{GATEP}$; $V_{B2BP}$) applied to the current path of said respective electronic switch the at least one reference voltage between said bias voltage and the voltage at said output node.

In one or more embodiments, said high input current circuit section may comprise a pair of power transistors (for instance, 110, 110a) arranged with cascaded (essentially, series connected) current paths therethrough in a back-to-back (for instance, common source) configuration.

One or more embodiments may comprise undershoot protection circuitry (for instance, III) comprising, coupled between the output node and ground, a cascaded arrangement of:

an undershoot diode (for instance, D1) configured to become conductive a result of the input node receiving a supply signal of said second polarity, and an undershoot current limiting resistor (for instance, R1).

Figure 5:
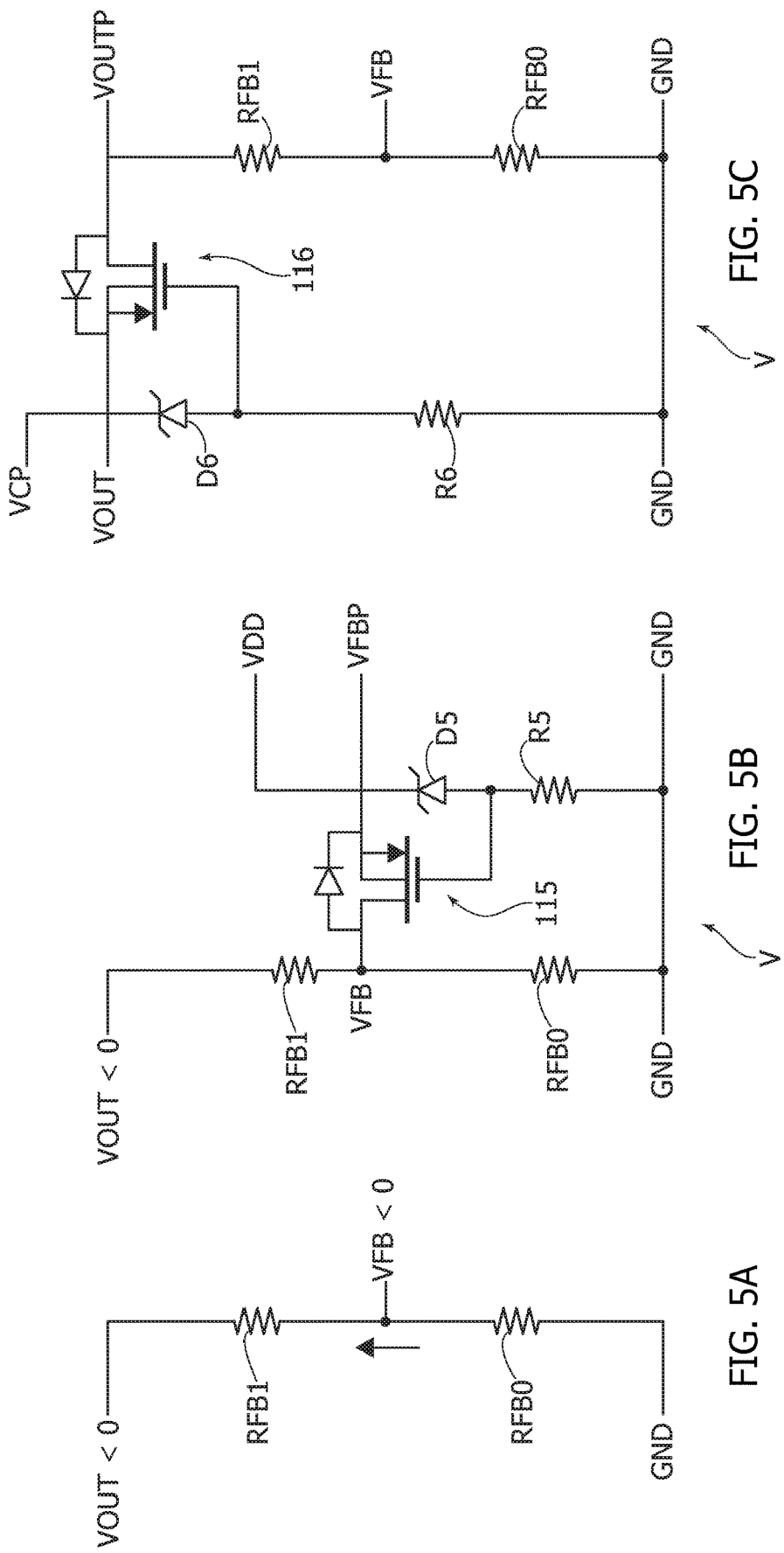
FIGS. 5A-5C is exemplary of a possible implementation of embodiments.

One or more embodiments may comprise:

a feedback signal path from the output node to the low input current circuit section, the feedback signal path comprising a resistive divider network (for instance, RFB0, RFB1) configured to be coupled between the output node and ground with an intermediate divider node (for instance, VFB) configured to be coupled to the low input current circuit section, and feedback protection circuitry (for instance, V) comprising:

a) a feedback protection switch (for instance, 115, respectively 116) comprising one of:

a1)—see FIG. 5, portion (b)—an output electronic switch (for instance, 115) of the resistive divider network, said output electronic switch arranged between said intermediate divider node of the resistive divider network and the low input current circuit section (see, for instance VFBP), or a2)—see FIG. 5, portion (c)—an input electronic switch (for instance, 116) of the resistive divider network, said input electronic switch arranged between the output node and the divider network (see, for instance $V_{OUTP}$);

wherein the low input current circuit section is coupled to said intermediate divider node as a result of said feedback protection switch (for instance, 115, respectively 116) being switched on, b) a feedback protection diode (for instance, D5, respectively D6) coupled to said feedback protection switch wherein said feedback protection diode is sensitive (for instance, via VDD, respectively VCP) to the polarity of said supply signal at the input node, the feedback protection diode configured to switch off said feedback protection switch and decouple the low input current circuit section from the resistive divider network as a result of the input node receiving a supply signal of said second polarity.

One or more embodiments may comprise said feedback protection diode and a control electrode of said feedback protection switch coupled to ground via a joint resistor (for instance, R5, respectively R6).

One or more embodiments may comprise said input electronic switch (for instance, 116) of the resistive divider network arranged between the output node and the divider network and said feedback protection diode coupled to said charge pump circuitry (for instance, 120, in the low input current circuit section 12) to receive said bias voltage (for instance, VCP) therefrom.

One or more embodiments may comprise an electrostatic discharge (ESD) protection network (for instance, VI), the electrostatic discharge protection network comprising:

a first electrostatic discharge rail (for instance, ESD-HR) and a second electrostatic discharge rail (for instance, ESD-LR), first electrostatic discharge diodes (for instance, ESD1, ESD3, ESD5, ESD7) conductive towards the first electrostatic discharge rail from said input node, said output node and ground, respectively, second electrostatic discharge diodes (for instance, ESD2, ESD4, ESD9) conductive from the second electrostatic discharge rail towards said input node, said output node and ground, respectively.

One or more embodiments may comprise a voltage clamp (for instance, DC9) configured to clamp together the first and the second electrostatic discharge rails as a function of the signal at said semiconductor well (for instance, NW).

In one or more embodiments, a device may comprise:

a circuit according to one or more embodiments, a power supply source (for instance, $V_S$) coupled to said input node and configured to apply to said input node a supply signal of a first polarity or a second polarity, the second polarity opposite the first polarity, and an electrical load (for instance, L) coupled to said output node.

Without prejudice to the underlying principles, the details and embodiments may vary, even significantly, with respect to what has been described by way of example only without departing from the extent of protection.

The extent of protection is determined by the annexed claims.

The invention claimed is:

1. A circuit, comprising:
   a power transistor having a current conduction path coupled between an input node and an output node, the power transistor having a control electrode, a first conduction electrode coupled to the input node and a second conduction electrode coupled to the output node;
   a control circuit having an output configured to generate a gate control signal for application to the control electrode of the power transistor; and
   a polarity reversal protection circuit configured to sense the input node to receive a supply signal of an incorrect polarity and in response thereto:
      a) disconnect application of the gate control signal to the control electrode of the power transistor; and
      b) directly electrically connect the control electrode of the power transistor to the current conduction path between the second conduction electrode of the power transistor and the output node.

2. The circuit of claim 1, wherein the polarity reversal protection circuit comprises a shorting circuit that provides the short circuit, said shorting circuit coupling the control electrode of the power transistor to the output node through the current conduction path.

3. The circuit of claim 1, wherein the polarity reversal protection circuit comprises a shorting circuit that provides the short circuit, said shorting circuit comprising:
   a first transistor switch having a conduction path coupled between the control electrode of the power transistor and the current conduction path between the second conduction electrode of the power transistor and the output node;
   a first resistor coupled between a control terminal of the first transistor switch and the current conduction path between the second conduction electrode of the power transistor and the output node; and
   a diode coupled in series with a second limiting resistor between ground and the control terminal of the first transistor switch.

4. The circuit of claim 1, wherein the polarity reversal protection circuit comprises a disconnecting circuit, said disconnecting circuit comprising:
   a second transistor switch having a conduction path coupled between the control electrode of the power transistor and the output of the control circuit generating the gate control signal; and
   a diode having a cathode coupled to receive a power supply voltage and an anode coupled to a control terminal of the second transistor switch;
   wherein said diode is sensitive to the incorrect polarity of said supply signal at the input node and configured to turn off the second transistor switch in response thereto.

5. The circuit of claim 4, wherein the disconnecting circuit further comprises a resistor coupling the anode of the diode and the control terminal of the second transistor switch to ground.

6. The circuit of claim 4, wherein the power supply voltage is generated by a charge pump circuit powered from the supply signal at the input node.

7. The circuit of claim 6, further comprising an addition polarity reversal protection circuit configured to pass a supply current from the input node to an input supply node of the charge pump circuit in response to a correct polarity of the supply signal, and further block passing of the supply current from the input node to the input supply node of the charge pump circuit in response to the incorrect polarity of the supply signal.

8. The circuit of claim 7, wherein the additional polarity reversal protection circuit comprises:
   a transistor switch having a conduction path coupled between the input node and the input supply node of the charge pump circuit; and
   a diode having a cathode coupled to the input supply node of the charge pump circuit and an anode coupled to a control terminal of the transistor switch;
   wherein said diode is sensitive to the incorrect polarity of said supply signal at the input node and configured to turn off the transistor switch in response thereto.

9. The circuit of claim 8, wherein the additional polarity reversal protection circuit further comprises a resistor coupling the anode of the diode and the control terminal of the transistor switch to ground.

10. The circuit of claim 1, wherein the power transistor is formed in a doped semiconductor well, and further comprising a current limiting resistor coupled between the doped semiconductor well and the input node.

11. A circuit, comprising:
   a power transistor having a current conduction path coupled between an input node and an output node, the power transistor having a control electrode, a first conduction electrode coupled to the input node and a second conduction electrode coupled to the output node;
   a control circuit having an output configured to generate a gate control signal for application to the control electrode of the power transistor;
   a feedback signal path configured to generate a feedback voltage from a voltage at the output node, wherein said control circuit is configured to generate said gate control signal in response to the feedback voltage; and
   a polarity reversal protection circuit configured to sense the input node receiving a supply signal having an incorrect polarity and in response thereto decouple the feedback voltage from the control circuit, wherein the polarity reversal protection circuit comprises:
      a transistor switch having a conduction path coupled between a node supplying the feedback voltage and an input of the control circuit and
      a diode having a cathode coupled to receive a reference voltage and an anode coupled to a control terminal of the transistor switch;
      wherein said diode is sensitive to the incorrect polarity of said supply signal at the input node and configured to turn off the transistor switch in response thereto.

12. The circuit of claim 11, wherein the polarity reversal protection circuit further comprises a resistor coupling the anode of the diode and the control terminal of the transistor switch to ground.

13. A circuit comprising:
   a power transistor having a current conduction path coupled between an input node and an output node, the power transistor having a control electrode, a first conduction electrode coupled to the input node and a second conduction electrode coupled to the output node;

a control circuit having an output configured to generate a gate control signal for application to the control electrode of the power transistor;
a feedback signal path configured to generate a feedback voltage from a voltage at the output node, wherein said control circuit is configured to generate said gate control signal in response to the feedback voltage;
a polarity reversal protection circuit configured to sense the input node receiving a supply signal having an incorrect polarity and in response thereto decouple the feedback voltage from the control circuit and an additional polarity reversal protection circuit configured to couple the feedback signal path to the output node in response to the incorrect polarity of the supply signal, and further decouple the feedback signal path from the output node in response to a correct polarity of the supply signal.

14. The circuit of claim 13, wherein the additional polarity reversal protection circuit comprises:
a transistor switch having a conduction path coupled between the output node and node supplying the feedback voltage to an input of the control circuit; and
a diode having a cathode coupled to the node supplying the feedback voltage and an anode coupled to a control terminal of the transistor switch;
wherein said diode is sensitive to the incorrect polarity of said supply signal at the input node and configured to turn off the transistor switch in response thereto.

15. The circuit of claim 14, wherein the additional polarity reversal protection circuit further comprises a resistor coupling the anode of the diode and the control terminal of the transistor switch to ground.

16. The circuit of claim 11, wherein the power transistor is formed in a doped semiconductor well, and further comprising a current limiting resistor coupled between the doped semiconductor well and the input node.

17. A circuit, comprising:
an input node configured to receive a supply signal of a first polarity or a second polarity, the second polarity being opposite the first polarity;
at least one power transistor having a current conduction path coupled between the input node and an output node, the at least one power transistor having a control electrode;
a control circuit configured to generate a control signal for application to the control electrode of the at least one power transistor, said control circuit including a charge pump circuit configured to generate a charge pump voltage for said control signal in response to a supply current received at an input supply node; and
a polarity reversal protection circuit configured to sense the input node receiving the supply signal of said second polarity and in response thereto directly electrically connect the control electrode of the at least one power transistor and the current conduction path.

18. The circuit of claim 17, wherein the polarity reversal protection circuit comprises a shorting circuit that provides the short circuit, said shorting circuit coupling the control electrode of the at least one power transistor to the output node through the current conduction path.

19. The circuit of claim 17, wherein the polarity reversal protection circuit comprises:
a first transistor switch having a conduction path coupled between the control electrode of the at least one power transistor and the current conduction path;
a first resistor coupled between a control terminal of the first transistor switch and the current conduction path; and
a diode coupled in series with a second limiting resistor between ground and the control terminal of the first transistor switch.

20. The circuit of claim 19, wherein the polarity reversal protection circuit further comprises:
a second transistor switch having a conduction path coupled between the control electrode of the at least one power transistor and the control signal generated by the control circuit;
a diode having a cathode coupled to the charge pump voltage and an anode coupled to a control terminal of the second transistor switch;
wherein said diode is sensitive to the polarity of said supply signal at the input node, the diode configured to turn off the second transistor switch as a result of the input node receiving the supply signal of said second polarity.

21. The circuit of claim 20, wherein the polarity reversal protection circuit further comprises a resistor coupling the anode of the diode and the control terminal of the second transistor switch to ground.

22. A circuit, comprising:
an input node configured to receive a supply signal of a positive polarity or a negative polarity;
at least one power transistor having a current conduction path coupled between the input node and an output node, the at least one power transistor having a control electrode;
a control circuit configured to generate a control signal for application to the control electrode of the at least one power transistor, said control circuit including a charge pump circuit configured to generate a charge pump voltage for said control signal in response to a supply current received at an input supply node;
a feedback signal path configured to generate a feedback voltage from a voltage at the output node, wherein said control circuit is configured to generate said control signal in response to the feedback voltage; and
a polarity reversal protection circuit configured to pass the feedback voltage to the control circuit as a result of the input node receiving the supply signal of said positive polarity, and further decouple the feedback voltage from the control circuit as a result of the input node receiving the supply signal of said negative polarity, wherein the polarity reversal protection circuit comprises:
a transistor switch having a conduction path coupled between a node supplying the feedback voltage and an input of the control circuit and
a diode having a cathode coupled to receive a reference voltage and an anode coupled to a control terminal of the transistor switch;
wherein said diode is sensitive to the polarity of said supply signal at the input node, the diode configured to turn off the transistor switch as a result of the input node receiving the supply signal of said negative polarity.

23. The circuit of claim 22, wherein the polarity reversal protection circuit further comprises a resistor coupling the anode of the diode and the control terminal of the transistor switch to ground.

24. A circuit, comprising:
an input node configured to receive a supply signal of a positive polarity or a negative polarity;

at least one power transistor having a current conduction path coupled between the input node and an output node, the at least one power transistor having a control electrode;

a control circuit configured to generate a control signal for application to the control electrode of the at least one power transistor, said control circuit including a charge pump circuit configured to generate a charge pump voltage for said control signal in response to a supply current received at an input supply node;

a feedback signal path configured to generate a feedback voltage from a voltage at the output node, wherein said control circuit is configured to generate said control signal in response to the feedback voltage; and a polarity reversal protection circuit configured to couple the feedback signal path to the output node as a result of the input node receiving the supply signal of said positive polarity, and further decouple the feedback signal path from the output node as a result of the input node receiving the supply signal of said negative polarity, wherein the polarity reversal protection circuit comprises:

a transistor switch having a conduction path coupled between the output node and node supplying the feedback voltage to an input of the control circuit and a diode having a cathode coupled to receive the charge pump voltage and an anode coupled to a control terminal of the transistor switch;

wherein said diode is sensitive to the polarity of said supply signal at the input node, the diode configured to turn off the transistor switch as a result of the input node receiving the supply signal of said negative polarity.

25. The circuit of claim 24, wherein the polarity reversal protection circuit further comprises a resistor coupling the anode of the diode and the control terminal of the transistor switch to ground.

26. A circuit, comprising:

an input node configured to receive a supply signal of a first polarity or a second polarity, the second polarity opposite the first polarity;

a first, high input current circuit section between the input node and an output node of the circuit, the high input current circuit section comprising at least one power transistor coupled to the input node and the output node, the at least one power transistor having a current conduction path therethrough and a control electrode;

a second, low input current circuit section configured to receive a supply current from the input node, the low input current circuit section configured to control the control electrode of the at least one power transistor in the high input current circuit section to control current flow from the input node to the output node via the current conduction path through the at least one power transistor in the high input current circuit section; and polarity reversal protection circuitry, the polarity reversal protection circuitry comprising:

a) a low input current circuit section protection circuit module configured to decouple the low input current circuit section from the input node as a result of the input node receiving a supply signal of said second polarity;

b) at least one high input current circuit section protection circuit module configured to short-circuit the current conduction path and the control electrode in said at least one power transistor coupled to the input node and the output node as a result of the input node receiving a supply signal of said second polarity;

a feedback signal path from the output node to the low input current circuit section, the feedback signal path comprising a resistive divider network configured to be coupled between the output node and ground with a intermediate divider node configured to be coupled to the low input current circuit section; and feedback protection circuitry comprising:

a) a feedback protection switch comprising one of:

a1) an output electronic switch of the resistive divider network, said output electronic switch arranged between said intermediate divider node of the resistive divider network and the low input current circuit section; or a2) an input electronic switch of the resistive divider network, said input electronic switch arranged between the output node and the resistive divider network;

b) a feedback protection diode coupled to said feedback protection switch wherein said feedback protection diode is sensitive to the polarity of said supply signal at the input node, the feedback protection diode configured to switch off said feedback protection switch and decouple the low input current circuit section from the resistive divider network as a result of the input node receiving a supply signal of said second polarity;

wherein the low input current circuit section is coupled to said intermediate divider node as a result of said feedback protection switch being switched on.

27. The circuit of claim 26, wherein the first polarity is a positive polarity and the second polarity is a negative polarity.

* * * * *